Patented Apr. 28, 1942

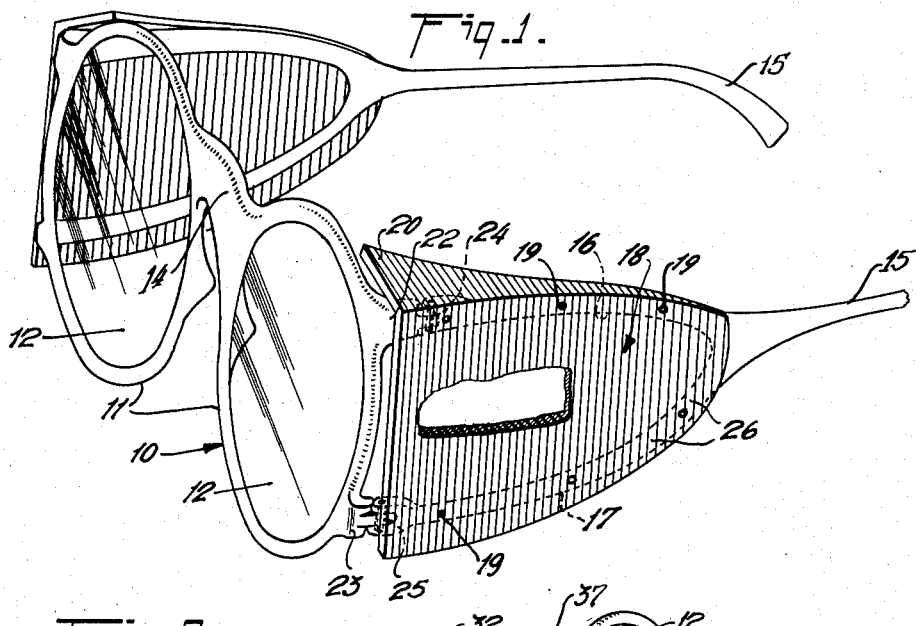

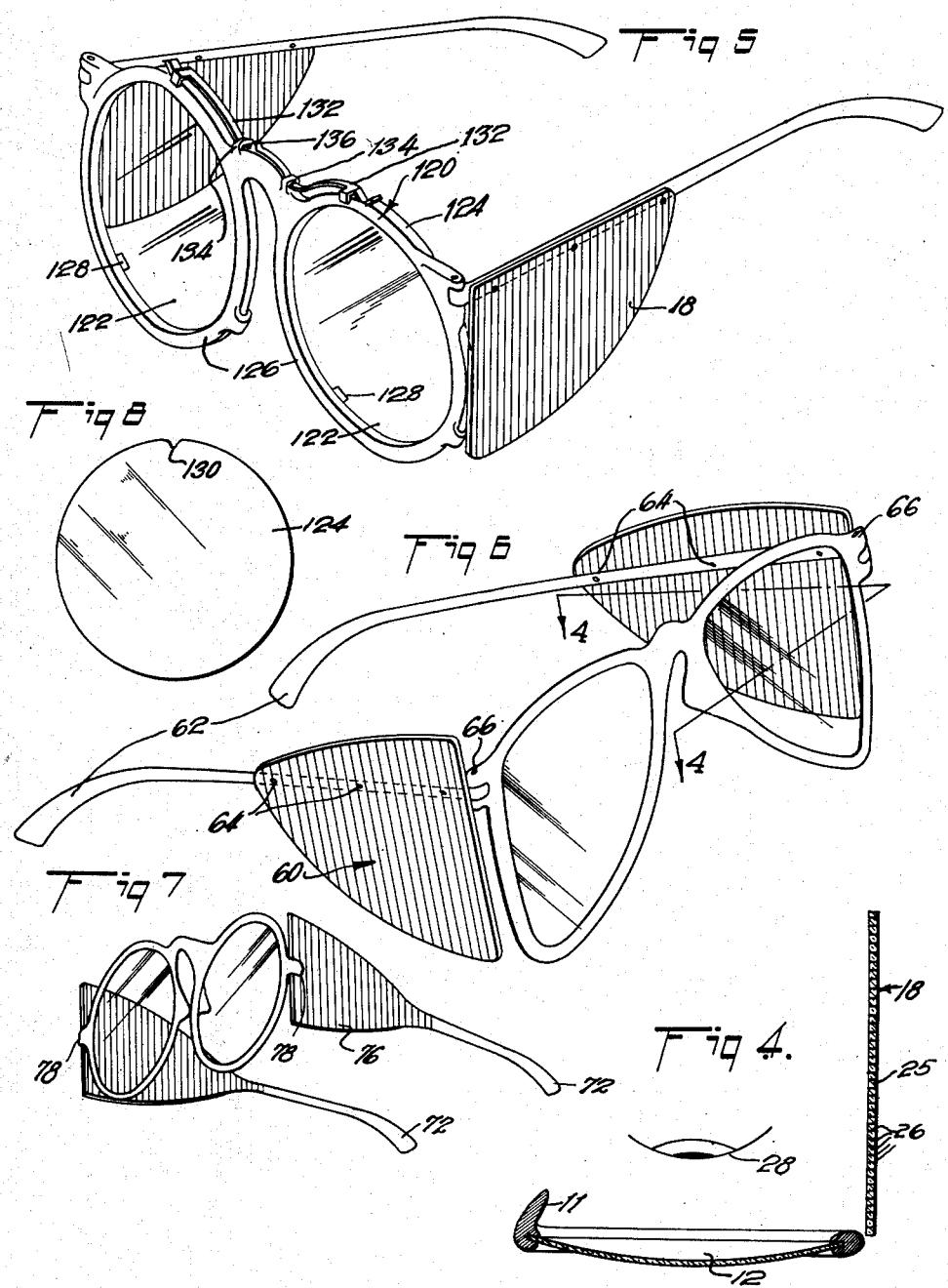

2,281,129

UNITED STATES PATENT OFFICE 2,281,129

OPHTHALMIC MOUNTING

Otto E. Wolff, Arlington, Mass., assignor to Polaroid Corporation, Dover, Del., a corporation of Delaware Application November 9, 1939, Serial No. 303,549

8 Claims. (Cl. 2—13)

This invention relates to an improved ophthalmic mounting, and more specifically to a spectacle frame for use with sunglasses or the like, and provided with side guards adapted to block light from the sides and rear which might otherwise strike the rear faces of the lenses held by the frame.

An object of the invention is to provide a mounting of the character described wherein the guard means comprise a plurality of substantially vertical, spaced, opaque strips.

A further object of the invention is to provide such a mounting in which the said opaque strips are so positioned as to block light from the rear while permitting the wearer of the ophthalmic mounting to see to the side and between the opaque strips.

A still further object of the invention is to provide such a mounting in which the side guards each comprise a substantially transparent sheet having thin, spaced, opaque strips therein.

Other objects of the invention are to provide a polarizing sunglass equipped with a mounting of the character described; to provide a variable density glass equipped with such a mounting; to provide an ophthalmic frame equipped with such a mounting in which the mounting substantially conforms to the shape of the face of the wearer and substantially blocks all light from the rear which might strike the rear faces of the lenses in the mounting.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the accompanying drawings, in which:

Fig. 1 is a view in perspective, partly broken away, of a device embodying one form of the invention;

Fig. 2 is a perspective view, partly broken away, of a device embodying a modified form of the invention;

Fig. 3 is a perspective view of a device embodying a still further modification of the invention;

Fig. 4 is a fragmentary view in section, for example along the line 4—4 of Fig. 6, showing diagrammatically how one form of the invention operates;

Fig. 5 is a perspective view of a variable density sunglass embodying one form of the invention;

Fig. 6 is a view in perspective of a modification of the form of the invention shown in Fig. 2;

Fig. 7 is a view in perspective of a modification of the form of the invention shown in Fig. 3; and Fig. 8 is a plan view of one of the lenses employed in the variable density glass shown in Fig. 5.

One of the serious objections to the use of eyeglasses of all forms, and more particularly to the use of sunglasses, arises from the fact that light striking the rear faces of the lenses held in the ophthalmic mountings of the glasses is reflected back into the eyes of the wearer of the glasses, giving rise either to distracting bright spots and highlights, or to mirror reflections of objects behind the wearer. This reflected light may become exceedingly annoying and may actually impair vision. Means have been suggested heretofore and used with the intention of eliminating such reflections. These means have comprised generally substantially opaque or opaque side guards or blinders which extend from the lens rearwardly along the temple bars of the ophthalmic mounting, and which substantially block all light from the rear and side. These side guards, while they have resulted in a diminution or suppression of the undesired reflections, have, however, substantially reduced the field of vision of the wearer, for so little light is transmitted by them that a person wearing eyeglasses so equipped can see little or nothing to the side, his vision being restricted substantially to the field visible through the lenses in the mounting.

This invention contemplates the provision of a new form of side guard which is adapted to block light from the rear which would otherwise strike the lenses and give rise to the undesired reflections, but which is adapted to permit the wearer of the glasses to look to the side and around the edges of the lens mounting and to see objects which are not in the field of view visible through the lenses themselves. Such a structure is particularly advantageous in connection with the use of sunglasses, for in most instances the wearers of the glasses have no need for a lens having power, and there is no reason therefore why their vision should be restricted to the field visible through the lenses.

Speaking generally, the side guards employed with the mounting of the present invention may comprise either a plurality of relatively thin, substantially vertical, spaced, opaque elements so positioned that the wearer of the eyeglass so equipped may look laterally between adjacent elements without having his vision blocked, as shown for example in Figs. 2 and 3, or more preferably the side guard may comprise a portion of a sheet of a transparent plastic which has incorporated therein a plurality of thin, substantially parallel, spaced, opaque strips or stripes. Such a device is shown, for example, in Figs. 1, 5, 6 and 7. It will be apparent that sheets of such a plastic material may be cut and shaped to conform substantially to the face of a wearer of the glasses so equipped, and they may thus be adapted to eliminate substantially completely the undesired reflections from the rear surfaces of the lenses while permitting the wearer of the glasses so equipped to look to either side and around the edges of the frames holding the lenses without appreciable impairment of the field of vision.

One form of the invention is shown in Fig. 1, in which 10 represents generally a spectacle frame of any desired shape. This frame may comprise a plurality of lens mounting means 11 adapted to hold and position the lenses 12 and connected by the bridge 14. Side pieces or bows 15 are provided, and in the form shown in Fig. 1 each of these bows may comprise in part an upper arm 16 and a lower arm 17 hingedly mounted, as at 24, 25, to extending arms or lugs 22, 23 on the rims 11 of the lens mounting means. A side guard 18 of the type hereinafter more specifically described may be fastened to the arms 16, 17, as for example by the rivets 19, and this side guard 18 may comprise a top portion 20 bent inwardly around the arm 16 to intercept light propagated downwardly and from the side against the inner face of the lens elements 12.

The side guard 18 may, in the form shown in Fig. 1, comprise a transparent plastic sheet which is of sufficient thickness and strength to retain its shape and form, but which may be molded and cut to the desired shape and form, and which is made with a multiplicity of thin, spaced, substantially parallel opaque strips or stripes 26. These strips extend through the sheet 18 from one face to the other. They lie in planes substantially perpendicular to the faces of the sheet. When the sheet is viewed in a direction normal to its surface it appears transparent; the strips being of negligible width do not appreciably block light so traversing the sheet. When, however, the sheet is viewed in a direction at a considerable angle to the normal, and for example from the rear of the device, as shown in Fig. 1, the strips or stripes 26 act to block the transmission of light and to render the sheet substantially opaque. In this connection reference should be had to Fig. 4, which shows diagrammatically how such a sheet may be employed in a side guard in a device embodying the present invention. As there shown, the sheet 18 comprises transparent areas 25 spaced from each other by thin, opaque strips 26. The sheet is so employed in the product of the present invention that the strips 26 act to block light which would be incident on the inner face of the lens 12 from the rear. The strips 26, however, are so positioned in the sheet and the sheet may be employed in such a shape and conformation that light from the side may pass directly between adjacent strips 26 to the eye 28 of a wearer of the device, hence the wearer may look out to the side between the strips 26 and through the transparent portions 25 of the sheet, and thus see objects outside the field of vision visible through the lens elements 12.

With reference again to the device shown in Fig. 1, the extension of the sheet 18 around and over the upper arm 16 of the bow 15 to provide the top portion 20 makes highly desirable a departure from the usual hinge mounting employed. In the form of the device shown in Fig. 1, the short arms or lugs 22, 23 extending rearwardly from the frame 11 are employed as hinge elements for the bows 15. The hinge line, as shown in Fig. 1, extends from the hinge 24 downwardly to the hinge 25, and when the bow 15 is pivoted about this line the eyeglass mounting is found to take less space when the bows are closed and to be more completely protected from breakage than if the hinge line were, for example, in the plane of the lenses.

While a double hinge 24, 25 is shown in Fig. 1, it is to be understood that a single hinge, for example the hinge 24, may be employed without in any way impairing the structure shown. A device somewhat similar to that just described is shown, for example, in Fig. 6, save that in Fig. 6 the hinge elements are shown positioned substantially in the plane of the lens mounting means.

A suitable material for use in connection with the device shown in Fig. 1 in the formation of the side guards 18 is the plastic sheet now sold under the trade name "Louvreglas."

It is of course to be understood that the thickness of the sheet 18 may be altered and the spacing between adjacent opaque strips 26 changed without departing from the invention. So also the shape and form of the side guards may be changed, as shown for example in other modifications of the invention or otherwise without departing from the scope of the invention.

A modified form of the invention is shown in Fig. 2. In this form the bows 30 comprise spaced, straight arms 32, 34 hinged substantially in the plane of the lenses 12, as at 37 and 38. Between these spaced bow elements 32 and 34 there may be provided a multiplicity of thin, substantially parallel and substantially vertical opaque slats or strips 36. These strips may act functionally substantially as do the opaque strips 26 in the sheet 18 described in connection with Fig. 1. In the device shown in Fig. 2, however, the opaque strips 36 are intended to be separate elements, not a part of any sheet-like means, but rather in the nature of independent slats or strips which are mounted in the arms 32, 34. They may thus be considered as a plurality of spaced, substantially opaque louvres.

In Fig. 6 there is shown an eyeglass in which the frame is substantially of the same type as that shown in Fig. 2, except that in the device shown in Fig. 6 side guards 60 comprise plastic material provided with opaque strips of the type heretofore described in connection with the description of Fig. 1. It will be apparent that where such plastic material is employed with a frame structure such as that shown in Fig. 6, the bows 62 need not be divided, but may consist of a single rearwardly extending strip to which the side guards are riveted, as at 64, or to which the side guards are otherwise affixed. With such a structure a single hinge 66 is required to connect the bows 62 to the lens holding frame.

A still further modification of the invention is shown in Fig. 3. In this device the ophthalmic mounting is provided with bows 40 which are hinged as at 42 to substantially the extreme outer points on the frame 44. Such a hinge mounting differs from that shown in Fig. 2, for example, where the bow 30 is hinged at the upper and lower portions of the frame, whereas in the device shown in Fig. 3 the bow 40 is hinged substantially to the mid point or center of the outer edge of the frame. To the bow 40 there may be affixed a plurality of spaced opaque slats or louvres 46 of the type described in connection with the elements 36 in Fig. 2. These spaced louvres may be mounted in the bow 40 and held thereby in spaced relation to function to block light which would otherwise impinge from the rear upon the rearward faces of the lenses 12.

In Fig. 7 there is shown a modification of the invention in which Louvreglas or some similar material is employed, and in which the opaque strips 76 are not mechanically separated, but are part of a plastic or similar sheet. In the form shown in Fig. 7 the bows 72 may be made from the plastic sheet itself, and the sheet may be hinged, as for example at 78, to the lens-engaging frame.

It will be understood that the device shown in Fig. 6 or in Fig. 1, for example, may be modified by eliminating the separate bow elements and by molding the bows from the material which comprises the side guards, as shown and described in connection with the device shown in Fig. 7.

The device of the present invention is adapted for use with any form of lens. The glare-eliminating side guards of the type described may be employed with ordinary spectacles in which the lens elements 12 are ground to prescription, or they may be employed with sunglasses in which the lens elements 12 have substantially no power and may comprise tinted glass or plastic material or light-polarizing elements, such for example as sheets of the light-polarizing material sold under the trade name "Polaroid."

In one embodiment of the invention the side guards of the character described may be employed with a variable density light-polarizing glass, such for example, as is disclosed in the patent to Land No. 2,005,426, which issued June 18, 1935, for Polarizing visor or sun shade. Such an embodiment of the invention is shown in Fig. 5. Here the frame shown generally at at 120 may be adapted for holding in each eye-piece a plurality of light-polarizing elements 122, 124. The outer ones of these elements 122 may be fixedly positioned in the frame 126. This frame may be provided in each eye-piece with a plurality of rearwardly extending lug elements 128 shaped and positioned to engage and hold a second light-polarizing lens element 124. Such a lens element is shown in plan view in Fig. 8. It may be provided with a notch or indentation 130 adapted to be engaged by a laterally movable strip 132, the end portions of which may be depressed so as to engage the notches of the lenses 124. The strip 132 may be held adjacent the upper portion and bridge of the frame of the eyeglass 120 by means of straps 134, for example, and the strip 132 may be provided with a protrusion or lug 136 integral therewith so that as the protrusion is moved laterally the strip moves with it and causes the lenses 124 to rotate. Rotation of the lenses 124 with respect to the lenses 122 causes an alteration in the density of the combined pair of lenses. If the lenses 122 are arranged with their axes parallel and parallel also to the axes of the lenses 124 when the lug 136 is at the extreme limit of movement in one direction, then as the lug 136 is moved in the other direction, the lenses 124 rotate and their polarizing axes become gradually crossed with the polarizing axes of the fixed lenses 122, thus decreasing the light transmitted through the combined pairs of lenses.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. An ophthalmic mounting comprising a spectacle frame having bows, said bows having affixed thereto and extending a substantial distance along the length thereof means providing a multiplicity of substantially vertical, spaced, thin, light-blocking elements positioned to substantially block light propagated from the rear of said mounting toward the front thereof and spaced from each other to permit the passage of light propagated in a direction substantially perpendicular to a plane defined by the bow and the light-blocking elements affixed thereto.

2. An ophthalmic mounting comprising a spectacle frame having bows, said bows having affixed thereto and extending a substantial distance along the length thereof means providing a multiplicity of substantially vertical, spaced, thin, light-blocking elements positioned to substantially block light propagated from the rear of said mounting toward the front thereof and spaced from each other to permit the passage of light propagated in a direction substantially perpendicular to a plane defined by the bow and the light-blocking elements affixed thereto, said light-blocking elements comprising portions of an otherwise substantially transparent sheet of a plastic material.

3. An ophthalmic mounting comprising a spectacle frame having bows, said bows having affixed thereto and extending a substantial distance along the length thereof means providing a multiplicity of substantially vertical, spaced, thin, light-blocking elements positioned to substantially block light propagated from the rear of said mounting toward the front thereof and spaced from each other to permit the passage of light propagated in a direction substantially perpendicular to a plane defined by the bow and the light-blocking elements affixed thereto, said light-blocking elements comprising separately mounted louvres.

4. An ophthalmic mounting comprising a spectacle frame having bows, each of said bows being hinged to lens-mounting means, each of said bows comprising a substantially rigid element subdivided adjacent said lens-mounting means into a plurality of spaced supporting elements, and means affixed to said spaced supporting elements and comprising a multiplicity of substantially opaque, thin, spaced strips extending from one to the other of said spaced supporting elements and adapted substantially to block light incident on said lens-mounting means from the direction in which said bows extend therefrom.

5. An ophthalmic mounting comprising a spectacle frame having bows hingedly affixed to lens-mounting means, each of said bows having affixed thereto a side guard, each side guard comprising a sheet of a transparent plastic material having therein a multiplicity of substantially parallel, spaced, light-blocking strips extending through said plastic substantially perpendicular to the faces thereof, said side guards being positioned so that said strips block light obliquely incident on said lens-mounting means from the rear when said frame is in position on the head of a user.

6. An ophthalmic mounting comprising side guards extending rearwardly along each of the bows of said mounting from points adjacent the lenses held by said mounting, each of said side guards comprising a transparent sheet of plastic material having a multiplicity of substantially opaque, spaced, thin, parallel strips therein, each of said sheets comprising a relatively large, substantially vertical portion and a relatively small, substantially horizontal portion extending inwardly toward the bridge of said frame from the top of said vertical portion.

7. An ophthalmic mounting comprising side guards extending rearwardly along each of the bows of said mounting from points adjacent the lenses held by said mounting, each of said side guards comprising a multiplicity of substantially opaque, substantially parallel, spaced louvres positioned to substantially block light incident on the rear faces of the lenses in said mounting at angles such that said light would be reflected into the eyes of a wearer of said mounting.

8. An ophthalmic mounting comprising side guards extending rearwardly along each of the bows of said mounting from points adjacent the lenses held by said mounting, each of said side guards comprising a multiplicity of substantially vertical, spaced, substantially opaque, thin elements extending substantially at right angles to the direction of extension of said bows.

OTTO E. WOLFF.